United States Patent
Huang

(10) Patent No.: US 9,039,202 B2
(45) Date of Patent: May 26, 2015

(54) MULTI-VIEW DISPLAY APPARATUS

(75) Inventor: June-Jei Huang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 259 days.

(21) Appl. No.: 13/525,381

(22) Filed: Jun. 18, 2012

(65) Prior Publication Data

US 2013/0147854 A1    Jun. 13, 2013

(30) Foreign Application Priority Data

Dec. 9, 2011    (TW) ............... 100145463 A

(51) Int. Cl.
| | |
|---|---|
| G02B 27/14 | (2006.01) |
| G03B 21/26 | (2006.01) |
| G03B 21/20 | (2006.01) |
| G03B 21/602 | (2014.01) |
| H04N 13/04 | (2006.01) |

(52) U.S. Cl.
CPC ........ *G03B 21/2013* (2013.01); *G03B 21/2033* (2013.01); *G03B 21/2066* (2013.01); *G03B 21/602* (2013.01); *H04N 13/0418* (2013.01); *H04N 13/045* (2013.01); *H04N 13/0459* (2013.01)

(58) Field of Classification Search
CPC ............... H04N 3/3129; H04N 9/3197; G03B 21/2013; G03B 21/2066; G03B 21/625; G03B 27/143
USPC .............. 353/30, 31, 94, 82, 33, 98; 348/750, 348/751; 362/227, 249.09; 359/629, 636, 359/638, 640, 833, 834, 455, 456
See application file for complete search history.

(56) References Cited

U.S. PATENT DOCUMENTS

| | | | |
|---|---|---|---|
| 4,919,515 A * | 4/1990 | Hasegawa et al. ............ 359/457 |
| 6,488,379 B2 * | 12/2002 | Kane ............................... 353/94 |
| 7,944,465 B2 | 5/2011 | Goulanian et al. | |
| 8,408,719 B2 * | 4/2013 | Shibasaki ........................ 353/94 |
| 2006/0066810 A1 * | 3/2006 | Shestak ............................. 353/7 |
| 2007/0097501 A1 * | 5/2007 | Stern et al. .................... 359/453 |
| 2008/0088800 A1 * | 4/2008 | Bellis et al. ..................... 353/30 |
| 2010/0079730 A1 | 4/2010 | Shibasaki | |

FOREIGN PATENT DOCUMENTS

| | | |
|---|---|---|
| CN | 101558349 A | 10/2009 |
| TW | 200905361 A | 2/2009 |
| TW | 200909863 A | 3/2009 |
| TW | 201116850 A | 5/2011 |
| TW | 201142464 A | 12/2011 |

* cited by examiner

*Primary Examiner* — William C Dowling
*Assistant Examiner* — Ryan Howard
(74) *Attorney, Agent, or Firm* — CKC & Partners Co., Ltd.

(57) ABSTRACT

A multi-view display apparatus includes a screen, a projection lens, two spatial light modulators, light sources, an optical guidance system and a combining prism. The light sources can radiate light in turn. When one of the light sources radiate light, the optical guiding system can divide the light into two portions and guide the two portions of the light to the spatial light modulators respectively, and the spatial light modulators can reflect the light. The combining prism can transmit light that is reflected from the spatial light modulators to the projection lens, where the projection lens is aligned with the screen in an optical path so that the screen can receive the light that is projected from the projection lens.

9 Claims, 10 Drawing Sheets

MULTI-VIEW DISPLAY APPARATUS

RELATED APPLICATIONS

This application claims priority to Taiwan Application Serial Number 100145463, filed Dec. 9, 2011, which is herein incorporated by reference.

BACKGROUND

1. Technical Field

The present disclosure relates to display devices, and more particularly, o multi-view display apparatus.

2. Description of Related Art

Providing vivid images to the consumers has long been the goal of display manufacturers and researchers. Among various advanced techniques, is the application of three-dimensional (3D) stereoscopy is one of the most sought after fields.

The 3D multi-view display technology has been developed by numerous manufacturers, such as Alioscopy, Apple, the Dimension Technologies, the Fraunhofer the HHI Holografika, a, i-Art, NewSight, Philips, SeeFront, SeeReal Technologies, Spatial, View, Tridelity, Sharp, Epson, Bolod, Spatial, View, StereoGraphics, 3D Experience Ltd, Opticality, Miracube, ACT Kern, Dresden 3D GmbH, LightSpace Technologies, Sence Graphics, 4D-Vision, Dimensional Media Associates, etc, in which the representative manufacturers are Alioscopy, NewSight, and Holografika. Alioscopy and NewSight each provide a cheaper 3D display with small volume for naked eye viewing, but this 3D display has a low-resolution. Holografika provides a 3D display having a high-resolution for naked eye viewing, but this 3D display is expensive and bulky. The basic method of Alioscopy and NewSight for realizing auto-stereoscopic display is to use a flat panel such as LCD or plasma display covered with lenticular or parallax-barrier sheet. The 3D panel display of Holografika utilizes many projectors for projecting images on multiple view zones. As to the method of Alioscopy and NewSight, the multiple viewing zones are achieved by sacrificing the resolution. Holografika's 3D display uses many projectors, and therefore this 3D display is expensive and bulky. In order to solve above-mentioned two problems, pixels of the projectors are combined with each other, and theses pixels are divided and used to represent one point with multiple directions. The means of diving pixels is to act the combined pixels as a display panel and further to cover the display panel with the barrier or the lenticular.

In view of the foregoing, there exist problems and disadvantages in the current 3D multi-view display techniques that await further improvement. However, those skilled in the art sought vainly for a solution. In order to solve or circumvent above problems and disadvantages, there is an urgent need in the related field to provide three-dimensional imaging conveniently.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

According to one embodiment of the present invention, a multi-view display apparatus includes a screen, a projection lens, two spatial light modulators, light sources, an optical guidance system and a combining prism. The light sources can radiate light in turn. When one of the light sources radiate light, the optical guiding system can divide the light into two portions and guide the two portions of the light to the spatial light modulators respectively, and the spatial light modulators can reflect the light. The combining prism can transmit light that is reflected from the spatial light modulators to the projection lens, where the projection lens is aligned with the screen in an optical path so that the screen can receive the light that is projected from the projection lens.

The screen includes a Fresnel lens acting as a collimating lens.

Additionally or alternatively, the screen includes a diffuser, a first array of cylinder lenses and a second array of cylinder lenses. The diffuser has a first side and a second side opposing to each other. The first array of cylinder lenses is disposed on the first side of the diffuser for receiving the light from the projection lens, and the second array of cylinder lenses is disposed on the second side of the diffuser, where a focal length less of the second array of cylinder lenses is less than a focal length less of the first array of cylinder lenses.

The optical guidance system includes a double-sided mirror, two relay modules and a plurality of collimating lenses. The collimating lenses collimate the light radiated by the light sources respectively. The double-sided mirror reflects a portion of the light transmitted from any of the collimating lenses to one of the two relay modules, and then said one of the two relay modules guides the portion of the light to one of the two spatial light modulators; the double-sided mirror doesn't reflect the other portion of the light, and another of the two relay modules directly guides the other portion of the light to another of the two spatial light modulators.

The relay modules include a first lens, a second lens, a third lens, a fourth lens, a fifth lens, a sixth lens, a first reflective mirror, a second reflective mirror, a third reflective mirror and a fourth reflective mirror. From the double-sided mirror to the one of the two spatial light modulators, in sequential order as the light passes therethrough: the first lens, the first reflective mirror, the second lens, the second reflective mirror and the third lens. From the double-sided mirror to said another of the two spatial light modulators, in sequential order as the light passes therethrough: the fourth lens, the third reflective mirror, the fifth lens, the fourth reflective mirror and the sixth lens.

The multi-view display apparatus further includes two total internal reflection prisms. The two total internal reflection prisms are disposed between the combining prism and the two spatial light modulators respectively. The light reflected by any of the spatial light modulators is transmitted through a corresponding one of the two total internal reflection prisms and combining prism to the projection lens.

Each of the light sources is a LED Module.

The multi-view display apparatus further includes a plurality of light drivers and a digital signal processor. The light drivers can drive the LED Modules respectively. The digital signal processor is coupled with the light drivers for controlling illumination timing of the LED Modules.

One of the two spatial light modulators is a first digital micro-mirror device, and the other is a second digital micro-mirror device.

The multi-view display apparatus further includes a first controller and a second controller. The first controller controls an on/off state of the first digital micro-mirror device, so that when the first digital micro-mirror device is turned on, the combining prism can receive the light reflected by the first digital micro-mirror device. The second controller controls an on/off state of the second digital micro-mirror device, so that when the second digital micro-mirror device is turned on, the combining prism can receive the light reflected by the second digital micro-mirror device.

Technical advantages are generally achieved, by embodiments of the present invention, as follows:

1. No light is wasted when two spatial light modulators are combined with the combining prism;
2. The light sources are shared by the two spatial light modulators, so as to decrease the number of actual illuminators; and
3. More view zones can be more easily sustained than is currently feasible with a lenticular or parallax barrier display, and a large number of views can be supported less expensively than with multi-projector. The challenge of time-multiplex method in producing light modulators with sufficiently fast refresh rates is much decreased.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
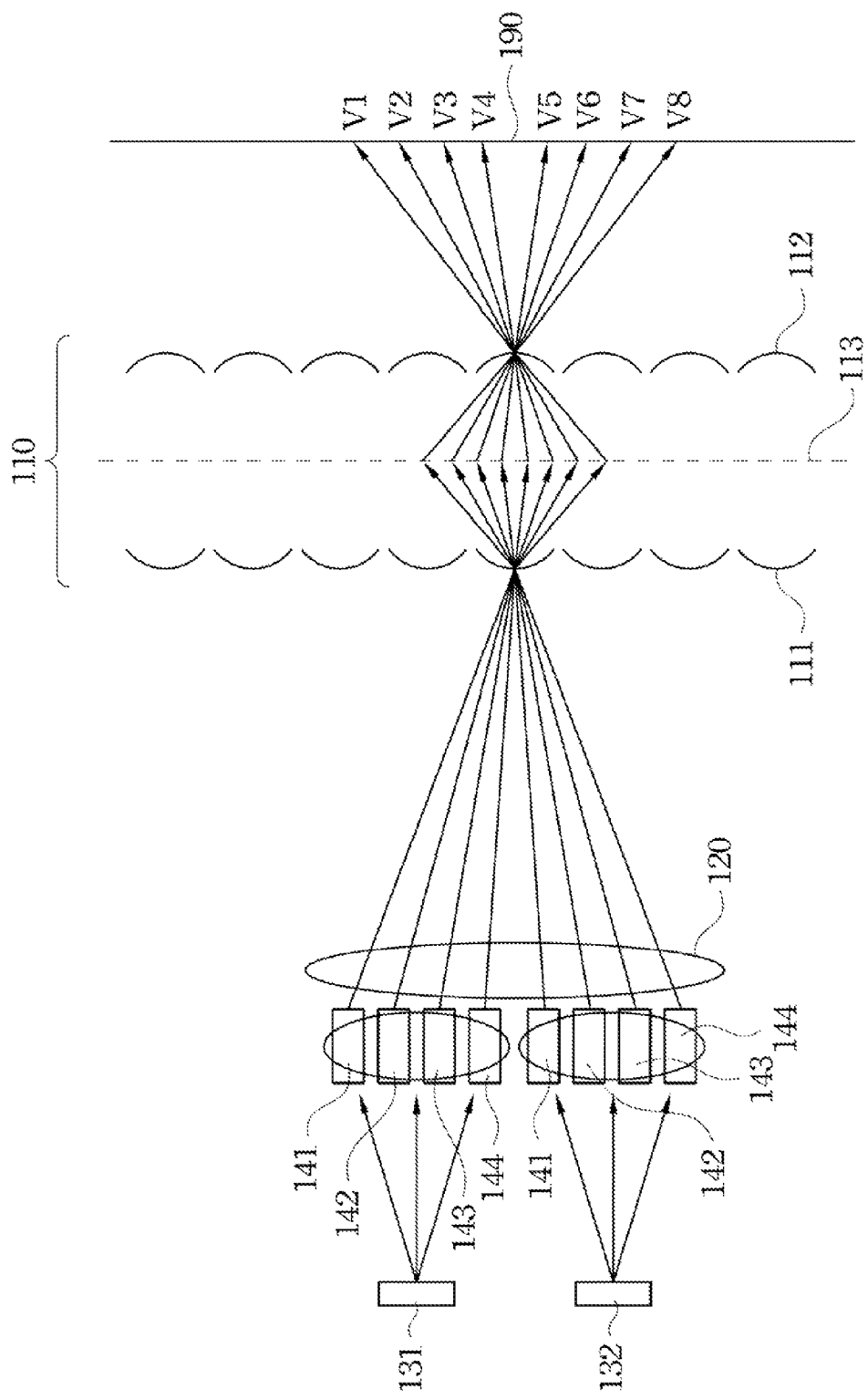
FIG. 1 is a schematic drawing of a multi-view display apparatus according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details.

In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include. or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one or more various aspects, the present invention is directed to a multi-view display apparatus. This apparatus may be easily inserted into -a display, and may be applicable or readily adaptable to all related technology. For a more complete understanding of the multi-view display apparatus, and the advantages thereof, please refer to FIGS. 5-9 and embodiments of the present disclosure.

FIG. 1 is a schematic drawing of a multi-view display apparatus 100 according to one embodiment of the present disclosure. As shown in FIG. 1, the multi-view display apparatus 100 includes a screen 110, a projection lens 120, a first spatial light modulator 131, a second spatial light modulator 132, and light sources 141-144. The light sources 141-144 can radiate light in turn. When one of the light sources 141-144 radiate light, the light is divided into two portions and then the two portions of the light is guided to the first and second spatial light modulators 131 and 132 respectively. The light that is reflected from the first and second spatial light modulators 131 and 132 is transmitted to the projection lens 120, where the projection lens 120 is aligned with the screen 110 in an optical path so that the screen 110 can receive the light that is projected from the projection lens 120. Thus, optical images V1-V8 can be provided for multiple view zones of a visible area 190.

In practice, the screen 110 includes a Fresnel lens acting as a collimating lens. Specifically, the screen 110 includes a first array of cylinder lenses 111, a second array of cylinder lenses 112 and a diffuser 113. The diffuser 113 has a first side and a second side opposing to each other. The first array of cylinder lenses 111 is disposed on the first side of the diffuser 113 for receiving the light from the projection lens 120, and the second array of cylinder lenses 112 is disposed on the second side of the diffuser 113, where a focal length less of the second array of cylinder lenses 112 is less than a focal length less of the first array of cylinder lenses 111.

It should be noted that FIG. 1 shows eight equivalent light sources 141-144 for illustrative purposes only. In fact, each light sources is shared by the first and second spatial light modulators 131 and 132, so that only four real light sources 141-144 can serves as the eight equivalent light sources by means of the two spatial light modulators.

Figure 2:
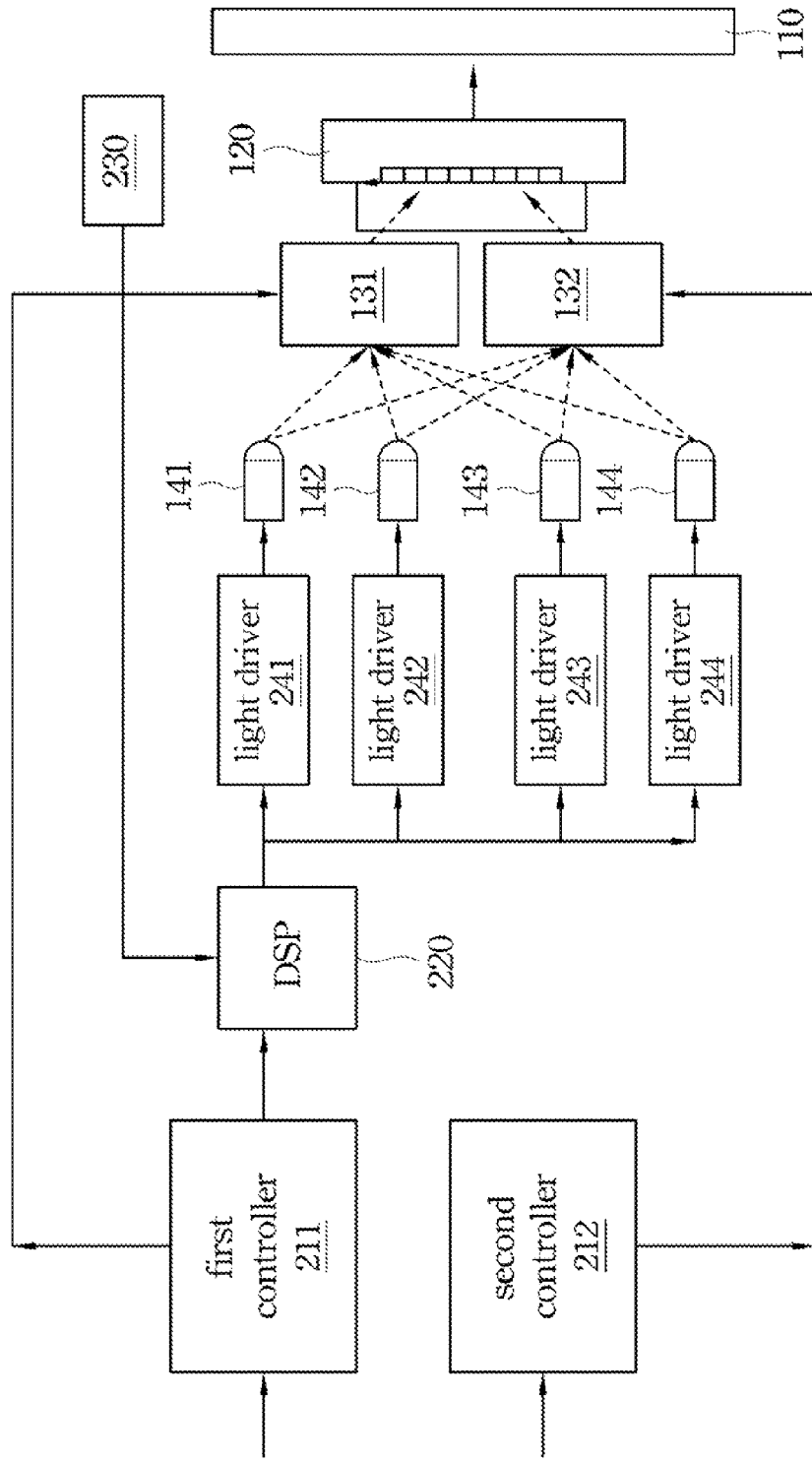
FIG. 2 is a block diagram of a multi-view display apparatus according to one embodiment of the present disclosure.

FIG. 2 is a block diagram of the multi-view display apparatus 100 according to one embodiment of the present disclosure. As shown in FIG. 1, the multi-view display apparatus 100 includes a first controller 211, a second controller 212, light drivers 241-244, a digital signal processor (DSP) 220 and a photo-sensor 230. The light drivers 241-244 are coupled with the light sources 141-144 respectively. The photo-sensor 230 is coupled with the digital signal processor 220.

In use, the light drivers 241-244 can drive the light sources 141-144 respectively. The photo-sensor 230 can detect a state of the light sources, and transmits data of the state to the digital signal processor 220. The digital signal processor 220 can control illumination timing of the light sources 141-144. For example, when any of the light sources is turned on to radiate light, and the others are turned off.

In this embodiment, each of the light sources 141-144 may be a LED Module. The LED Module includes three colors LED element (R, G, B), so as to generate optical images.

In FIG. 2, the multi-view display apparatus 100 includes the first controller 211 and the second controller 212. The first controller 211 is coupled with the first spatial light modulator 131, and the second controller 212 is coupled with the second spatial light modulator 132.

In use, the first controller 211 controls an on/off state of the first spatial light modulator 131, so that when the first spatial light modulator 131 is turned on, the light reflected by the first spatial light modulator 131 can be transmitted to the projection lens 120. The second controller 212 controls an on/off state of the second spatial light modulator 132, so that when the second spatial light modulator 132 is turned on, the light reflected by the second spatial light modulator 132 can be transmitted to the projection lens 120.

In this embodiment, the first spatial light modulator 131 may be a first spatial light modulator 131, and the second spatial light modulator 132 may be a second digital micro-mirror device. The controllers 211 and 212 may be two control IC.

Figure 3:
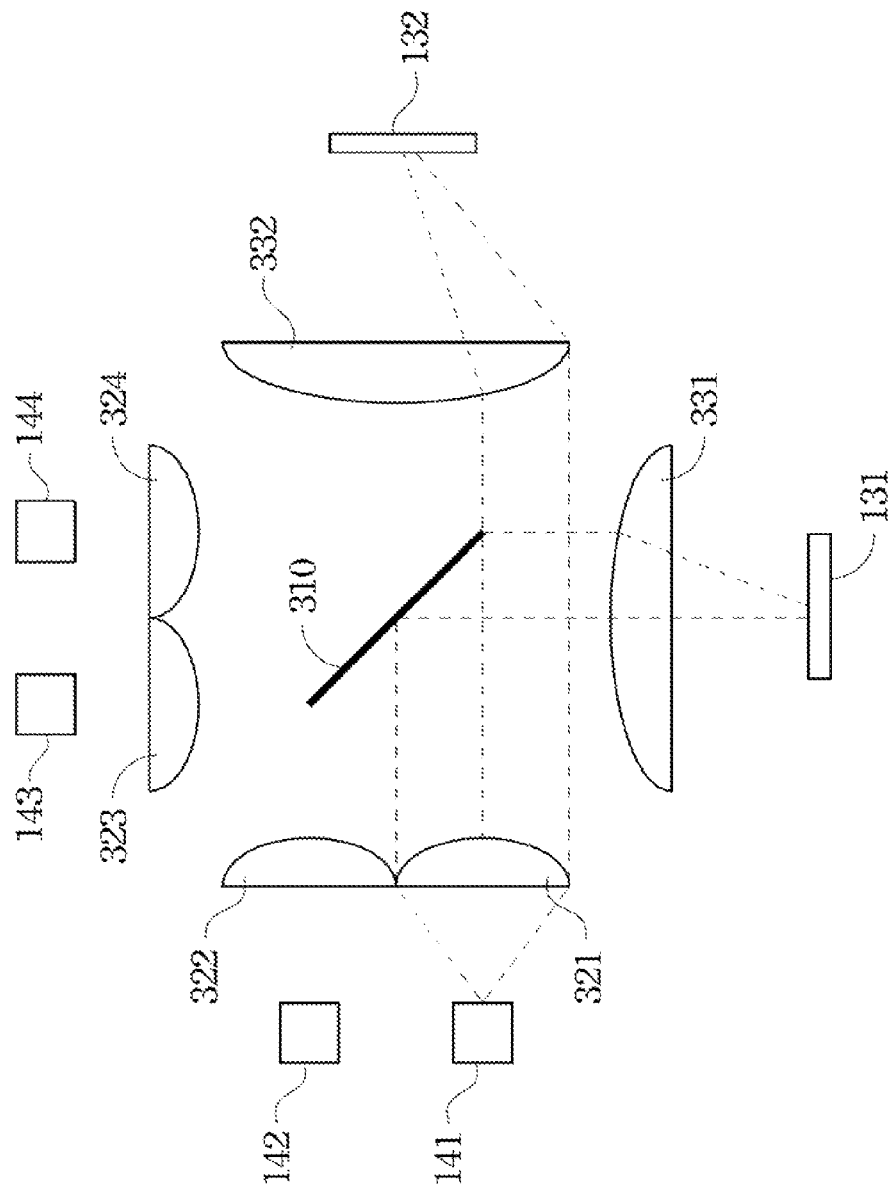
FIG. 3 is a schematic drawing of an optical guiding system according to one embodiment of the present disclosure.

FIG. 3 is a schematic drawing of an optical guiding system 300 according to one embodiment of the present disclosure. When one of the light sources 41-144 radiates light, the optical guiding system 300 can divide the light into two portions and guide the two portions of the light to the first and second spatial light modulators 131 and 132 respectively.

For a more complete understanding of the two spatial light modulators sharing the light sources, please refer to FIG. 3. The optical guidance system 300 includes a double-sided mirror 310, two relay modules 331 and 332, and a plurality of collimating lenses 321-324. The light source 141 and 142 are disposed in parallel and are aligned with the collimating lenses 321 and 322 respectively, the collimating lenses 321 and 322 are opposite to the relay module 332, and the relay module 332 is positioned corresponding to the second spatial light modulator 132. The light source 143 and 144 are disposed in parallel and are aligned with the collimating lenses 323 and 324 respectively, the collimating lenses 323 and 324 are opposite to the relay module 331, and the relay module 331 is positioned corresponding to the first spatial light modulator 131. The double-sided mirror 310 is orientated corresponding to a half aperture size of any of the relay modules 331 and 332, and is disposed between the relay modules 331-332 and the collimating lenses 321-324. An included angle between the double-sided mirror 310 and the light sources 141-144 is about 45°.

The collimating lenses 321-324 collimate the light radiated by the light sources 141-144 respectively. The double-sided mirror 310 reflects a portion of the light transmitted from the collimating lens 321 to the relay module 331, and then the relay module 331 guides the portion of the light to the spatial light modulator 131; the double-sided mirror 310 doesn't reflect the other portion of the light, and the relay module 332 directly guides the other portion of the light to another spatial light modulator 132. Similarly, the double-sided mirror 310 reflects a portion of the light transmitted from the collimating lens 322 to the relay module 331, and then the relay module 331 guides the portion of the light to the spatial light modulator 131; the double-sided mirror 310 doesn't reflect the other portion of the light, and the relay module 332 directly guides the other portion of the light to another spatial light modulator 132.

Furthermore, the double-sided mirror 310 reflects a portion of the light transmitted from the collimating lens 323 to the relay module 332, and then the relay module 332 guides the portion of the light to the spatial light modulator 132; the double-sided mirror 310 doesn't reflect the other portion of the light, and the relay module 331 directly guides the other portion of the light to another spatial light modulator 131. Similarly, the double-sided mirror 310 reflects a portion of the light transmitted from the collimating lens 324 to the relay module 332, and then the relay module 332 guides the portion of the light to the spatial light modulator 131; the double-sided mirror 310 doesn't reflect the other portion of the light, and the relay module 331 directly guides the other portion of the light to another spatial light modulator 131.

Figure 4:
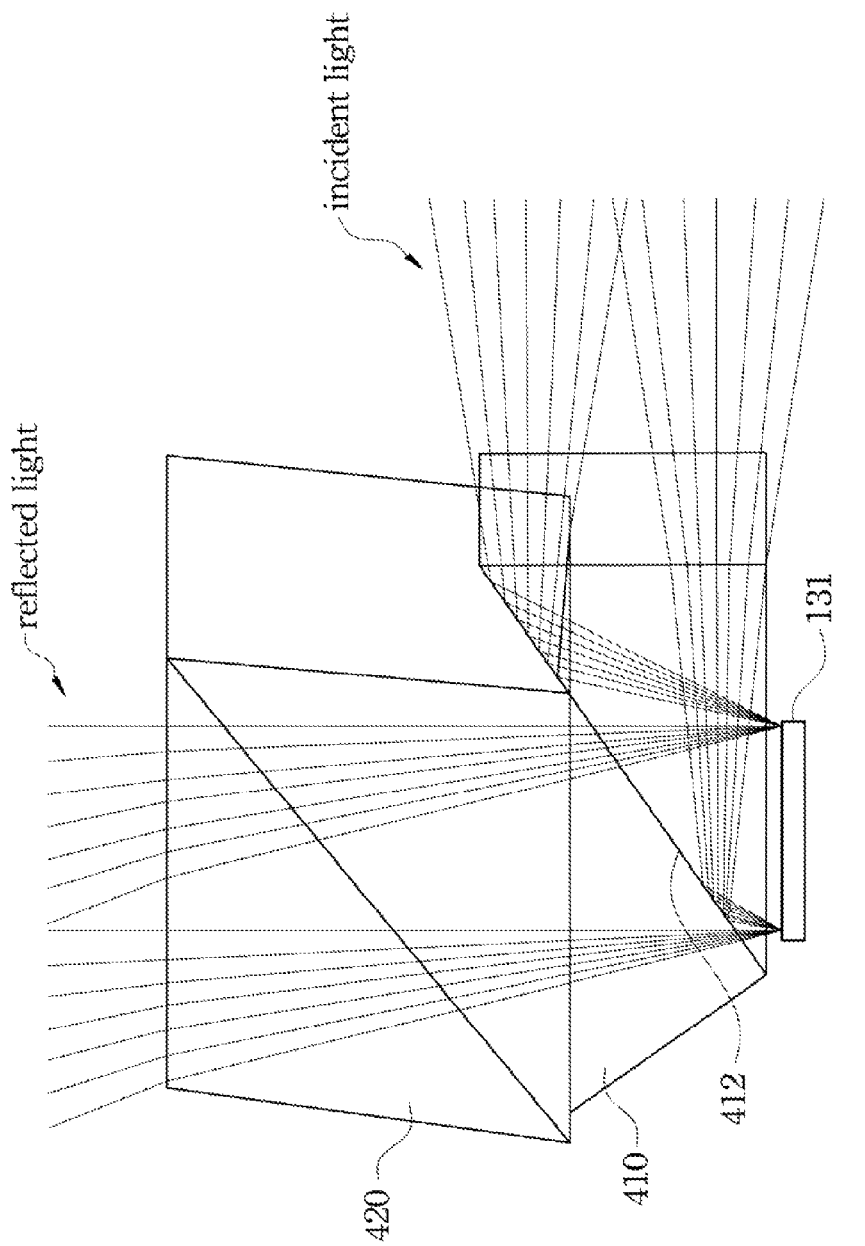
FIG. 4 shows a total internal reflection prism and a combining prism according to one embodiment of the present disclosure.
Figure 5:
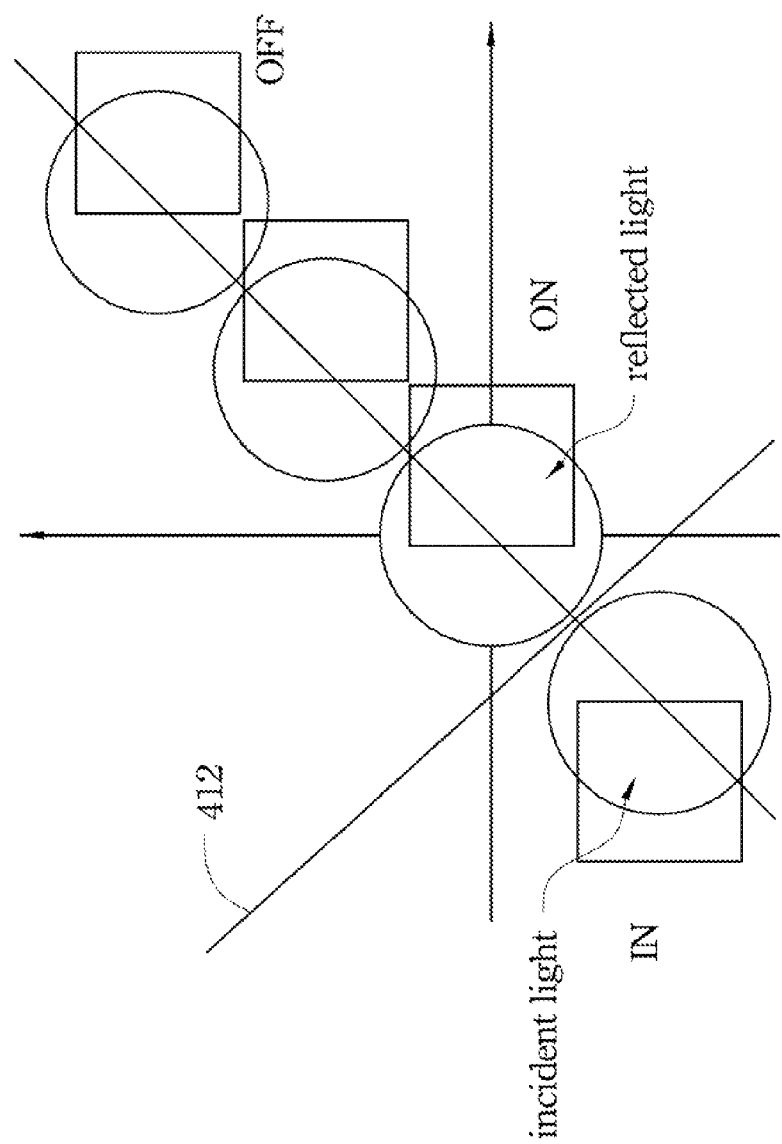
FIG. 5 is a schematic drawing of incident and reflected light of a spatial light modulator according to one embodiment of the present disclosure.

Refer to FIGS. 4 and 5, the total internal reflection prism 410 are disposed between the combining prism 420 and the spatial light modulator 131. In use, the total internal reflection prism 410 receives the light from the relay module 331, and its TIR surface 412 reflects the light to the spatial light modulator 131. When the spatial light modulator 131 is turned on, the spatial light modulator 131 reflects the light back to the combining prism 410, and the light transmitted through the total internal reflection prism 410 to the combining prism 420. On the contrary, when the spatial light modulator 131 is turned off, the spatial light modulator 131 guides the light to another place.

For example, the spatial light modulator 131 may be a digital micro-mirror device. When the digital micro-mirror device is turned on, the combining prism 420 can receive the light reflected by the digital micro-mirror device.

Figure 6:
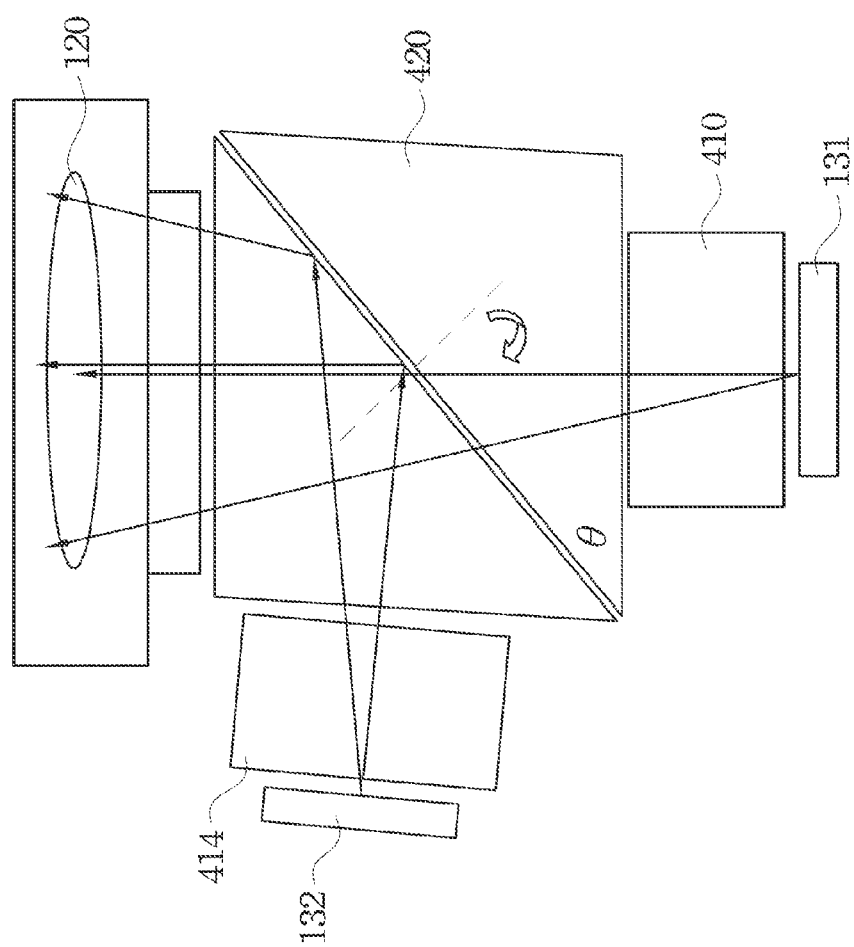
FIG. 6 shows an optical path of the combining prism according to one embodiment of the present disclosure.
Figure 7:
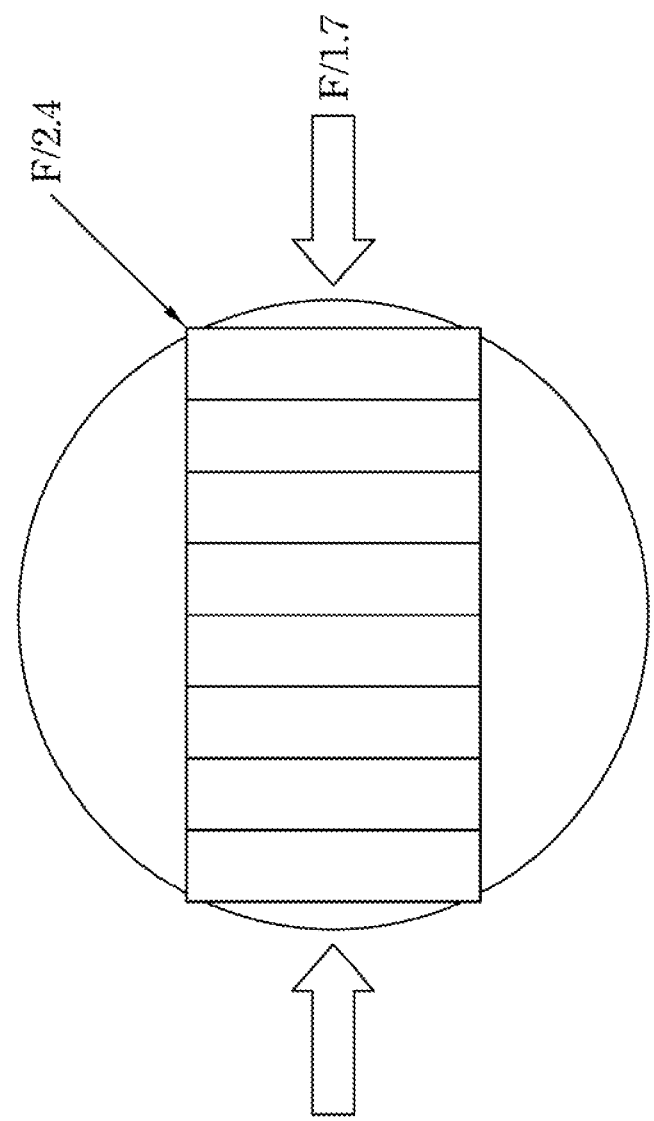
FIG. 7 is shows the exit pupil of a projection lens according to one embodiment of the present disclosure.

For a more complete understanding of the combining prism 420, please refer to FIG. 6. Two total internal reflection prisms 410 and 414 are disposed between the combining prism 420 and the two spatial light modulators 131-132 respectively. The total internal reflection prism 414 in structure is substantially the same as the total internal reflection prism 410, and, thus, is not repeated herein. In use, the light reflected by the spatial light modulator 131 is transmitted through the total internal reflection prism 410 and the combining prism 420 to the projection lens 120. Relatively, the light reflected by the spatial light modulator 132 is transmitted through the total internal reflection prism 414 and the combining prism 420 to the projection lens 120. In one embodiment, the exit pupil of the projection lens 120 is shown in FIG. 7.

Figure 8:
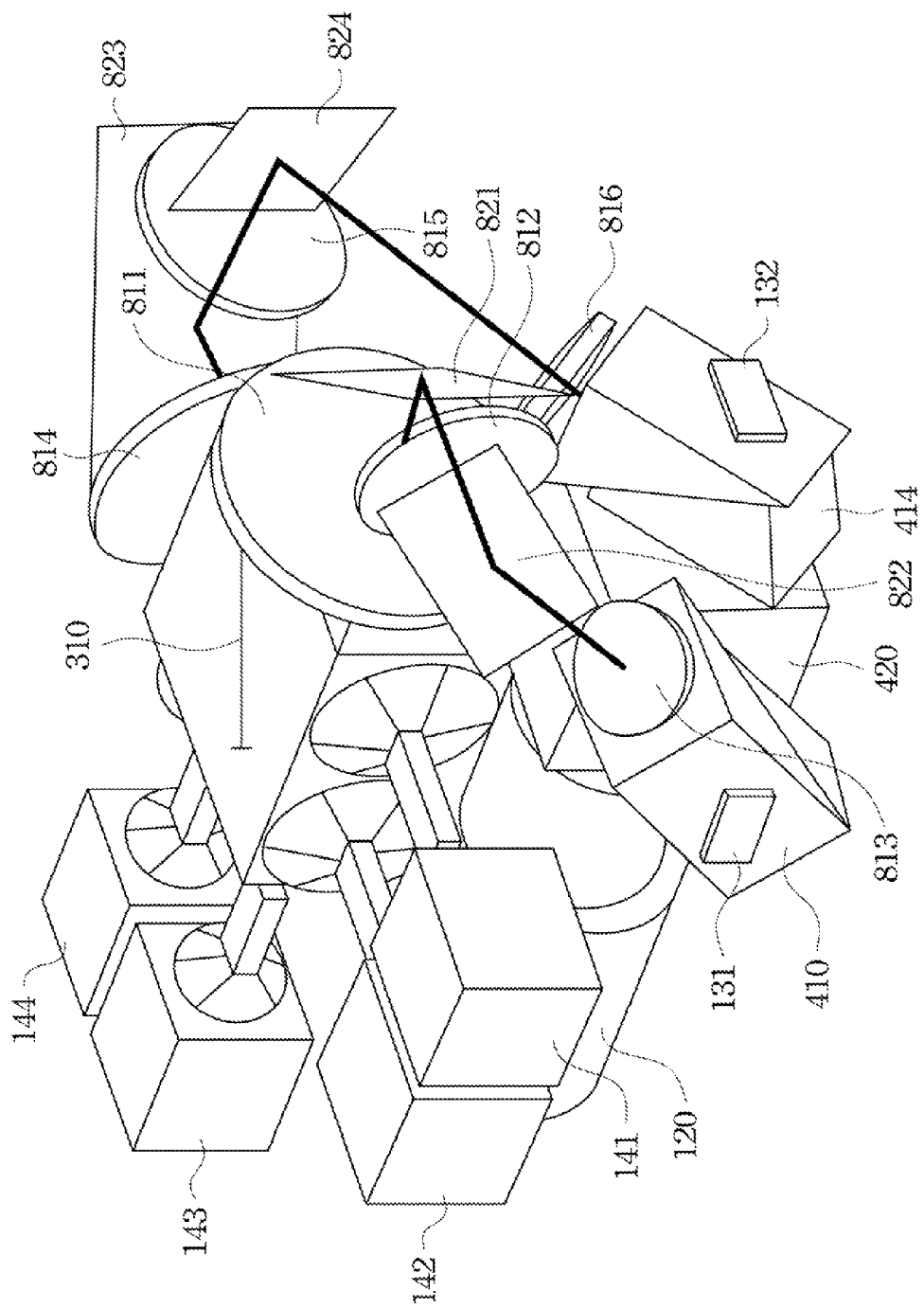
FIGS. 8-10 are pictorial drawings of the multi-view display apparatus from various view angles according to one embodiment of the present disclosure.
Figure 9:
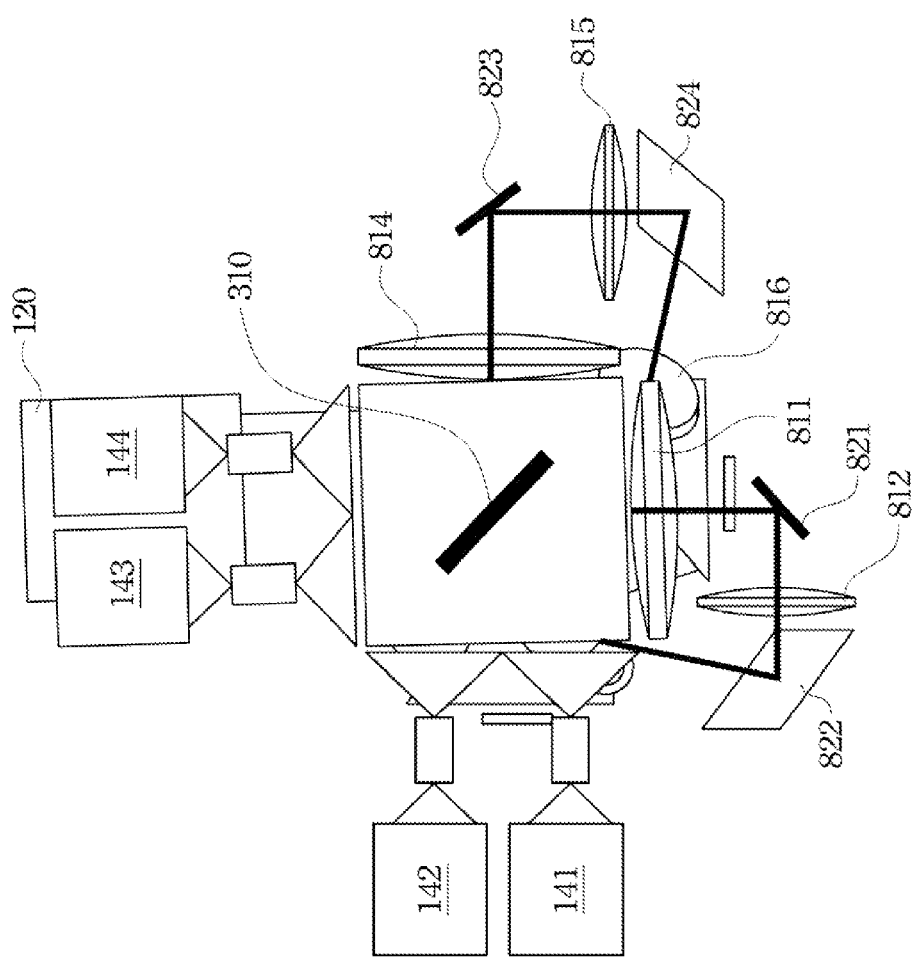
Figure 10:
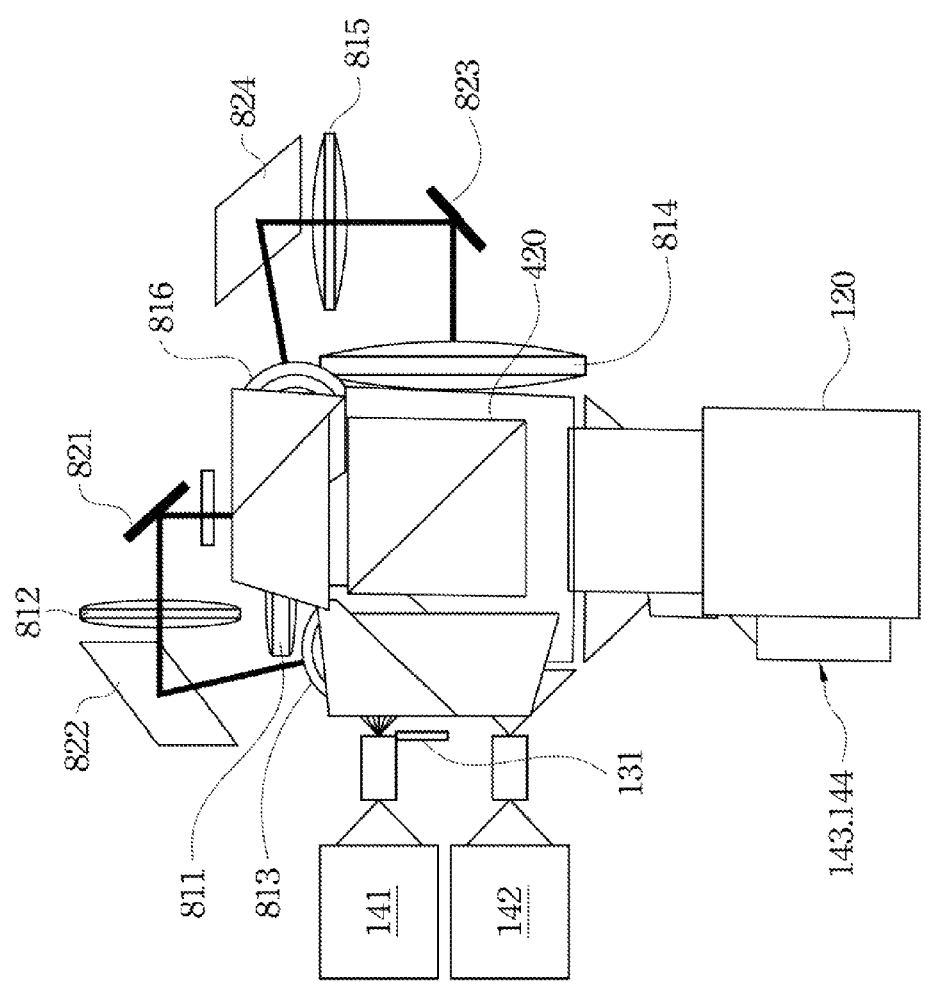

For a more complete understanding of above optical guidance system, please refer to FIGS. 8-10. The relay module 331 includes a first lens 811, a second lens 812, a third lens 813, a first reflective mirror 822 and a second reflective mirror 822. From the double-sided mirror 310 to the spatial light modulator 131, in sequential order as the light passes therethrough: the first lens 811, the first reflective mirror 821, the second lens 812, the second reflective mirror 822 and the third lens 813. Through this optical path, the light can be guided from the double-sided mirror 310 to the spatial light modulator 131.

The relay module 332 includes a fourth lens 814, a fifth lens 815, a sixth lens 816, a third reflective mirror 823 and a fourth reflective mirror 824. From the double-sided mirror 310 to the spatial light modulator 132, in sequential order as the light passes therethrough: the fourth lens 814, the third reflective mirror 823, the fifth lens 815, the fourth reflective mirror 824 and the sixth lens 816. Through this optical path, the light can be guided from the double-sided mirror 310 to the spatial light modulator 132.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A multi-view display apparatus comprising:
    a screen;
    a projection lens aligned with the screen in an optical path;
    two spatial light modulators for reflecting light;
    a plurality of light sources for radiating the light in turn;
    an optical guidance system for dividing the light into two portions and guiding the two portions of the light to the spatial light modulators respectively, and the optical guidance system comprising a double-sided mirror, two relay modules, and a plurality of collimating lenses for collimating the light radiated by the light sources respectively, wherein the double-sided mirror reflects a portion of the light transmitted from any of the collimating lenses to one of the two relay modules, and then said one of the two relay modules guides the portion of the light to one of the two spatial light modulators; the double-sided mirror doesn't reflect the other portion of the light, and another of the two relay modules directly guides the other portion of the light to another of the two spatial light modulators; and
    a combining prism for transmitting the light that is reflected from the spatial light modulators to the projection lens, so that the screen receives the light that is projected from the projection lens.

2. The multi-view display apparatus of claim 1, wherein the screen comprises a Fresnel lens acting as a collimating lens.

3. The multi-view display apparatus of claim 1, wherein the screen comprises:
    a diffuser having a first side and a second side opposing to each other;
    a first array of cylinder lenses disposed on the first side of the diffuser for receiving the light from the projection lens; and
    a second array of cylinder lenses disposed on the second side of the diffuser, wherein a focal length of the second array of cylinder lenses is less than a focal length less of the first array of cylinder lenses.

4. The multi-view display apparatus of claim 1, wherein the relay modules comprise:
    a first lens, a second lens, a third lens, a first reflective mirror and a second reflective mirror, wherein from the double-sided mirror to the one of the two spatial light modulators, in sequential order as the light passes therethrough are arranged the first lens, the first reflective mirror, the second lens, the second reflective mirror and the third lens; and
    a fourth lens, a fifth lens, a sixth lens, a third reflective mirror and a fourth reflective mirror, wherein from the double-sided mirror to said another of the two spatial light modulators, in sequential order as the light passes therethrough are arranged the fourth lens, the third reflective mirror, the fifth lens, the fourth reflective mirror and the sixth lens.

5. The multi-view display apparatus of claim 1, further comprising:
    two total internal reflection prisms disposed between the combining prism and the two spatial light modulators respectively, wherein the light reflected by any of the spatial light modulators is transmitted through a corresponding one of the two total internal reflection prisms and combining prism to the projection lens.

6. The multi-view display apparatus of claim 1, wherein each of the light sources is a LED Module.

7. The multi-view display apparatus of claim 6, further comprising:
    a plurality of light drivers for driving the LED Modules respectively; and
    a digital signal processor coupled with the light drivers for controlling illumination timing of the LED Modules.

8. The multi-view display apparatus of claim 1, wherein one of the two spatial light modulators is a first digital micro-mirror device, and the other is a second digital micro-mirror device.

9. The multi-view display apparatus of claim 8, further comprising:
    a first controller for controlling an on/off state of the first digital micro-mirror device, so that when the first digital micro-mirror device is turned on, the combining prism receives the light reflected by the first digital micro-mirror device; and
    a second controller for controlling an on/off state of the second digital micro-mirror device, so that when the second digital micro-mirror device is turned on, the combining prism receives the light reflected by the second digital micro-mirror device.

* * * * *